(12) United States Patent
Perunka et al.

(10) Patent No.: US 10,990,071 B2
(45) Date of Patent: Apr. 27, 2021

(54) MANAGING POWER DEMAND OF A PLURALITY OF PASSENGER TRANSPORT INSTALLATIONS

(71) Applicant: KONE Corporation, Helsinki (FI)

(72) Inventors: Pekka Perunka, Helsinki (FI); Pekka Perälä, Helsinki (FI); Tapio Tyni, Helsinki (FI); Janne Öfversten, Helsinki (FI); Ari Hänninen, Helsinki (FI)

(73) Assignee: KONE CORPORATION, Helsinki (FI)

( * ) Notice: Subject to any disclaimer, the term of this patent is extended or adjusted under 35 U.S.C. 154(b) by 108 days.

(21) Appl. No.: 16/168,192

(22) Filed: Oct. 23, 2018

(65) Prior Publication Data
US 2019/0137961 A1    May 9, 2019

(30) Foreign Application Priority Data
Nov. 7, 2017 (EP) .................... 17200335

(51) Int. Cl.
*G05B 19/042* (2006.01)
*G06Q 10/06* (2012.01)
(Continued)

(52) U.S. Cl.
CPC ..... *G05B 19/042* (2013.01); *G06Q 10/06312* (2013.01); *G06Q 10/06315* (2013.01);
(Continued)

(58) Field of Classification Search
CPC .......... G05B 19/042; G05B 2219/2639; G06Q 10/06312; G06Q 10/06315; G06Q 50/30; H02J 13/00
See application file for complete search history.

(56) References Cited

U.S. PATENT DOCUMENTS 6,935,467 B1 *   8/2005   Tyni .......................... B66B 1/20
                                                            187/382
7,032,715 B2 *   4/2006   Smith .................... B66B 1/2458
                                                            187/380
(Continued)

FOREIGN PATENT DOCUMENTS

EP        3 009 899 A2       4/2016

OTHER PUBLICATIONS

European Search Report issued in European Application No. 17200335. 2, dated Feb. 2, 2018.

*Primary Examiner* — Darrin D Dunn
(74) *Attorney, Agent, or Firm* — Birch, Stewart, Kolasch & Birch LLP (57) ABSTRACT

According to an aspect, there is provided a method for managing power demand of a plurality of passenger transport installations in at least one building. The method comprises obtaining first data on available time-dependent power consumption flexibility capacity from each passenger transport installation; obtaining second data from at least one external data source, the second data being independent from operation of the passenger transport installations; determining an activation order for power demand management of the plurality of passenger transport installations based on the obtained first data and second data; and transmitting a passenger transport installation specific activation signal for the power demand management to at least one passenger transport installation of the plurality of passenger transport installations in accordance with the activation order.

17 Claims, 3 Drawing Sheets

(51) Int. Cl.
*G06Q 50/30* (2012.01)
*H02J 13/00* (2006.01)

(52) U.S. Cl.
CPC ............ *G06Q 50/30* (2013.01); *H02J 13/00* (2013.01); *G05B 2219/2639* (2013.01)

(56) References Cited

U.S. PATENT DOCUMENTS

| | | | |
|---|---|---|---|
| 7,416,057 B2* | 8/2008 | Kostka | B66B 1/18 187/382 |
| 7,610,995 B2* | 11/2009 | Ylinen | B66B 1/468 187/382 |
| 8,417,391 B1* | 4/2013 | Rombouts | G06Q 40/04 700/291 |
| 8,457,802 B1 | 6/2013 | Steven et al. | |
| 8,538,595 B2* | 9/2013 | Lyren | G06Q 50/06 700/292 |
| 8,954,199 B2* | 2/2015 | Lyren | G05B 13/026 700/292 |
| 9,067,762 B2* | 6/2015 | Fargo | B66B 1/302 |
| 9,212,030 B2* | 12/2015 | Finschi | B66B 25/00 |
| 9,440,819 B2* | 9/2016 | Rossignol | B66B 1/302 |
| 9,592,994 B2* | 3/2017 | Finschi | B66B 1/2458 |
| 10,392,224 B2* | 8/2019 | Peterson | B66B 5/0012 |
| 10,683,189 B2* | 6/2020 | Saraswat | B66B 1/3407 |
| 2004/0163895 A1* | 8/2004 | Kostka | B66B 1/20 187/383 |
| 2005/0006183 A1* | 1/2005 | Smith | B66B 1/2458 187/380 |
| 2005/0217946 A1* | 10/2005 | Siikonen | B66B 1/2458 187/277 |
| 2007/0084673 A1* | 4/2007 | Smith | B66B 5/027 187/290 |
| 2008/0067013 A1* | 3/2008 | Ylinen | B66B 1/3415 187/382 |
| 2008/0105499 A1* | 5/2008 | Tyni | B66B 1/2458 187/382 |
| 2008/0296099 A1* | 12/2008 | Tyni | G06N 3/126 187/387 |
| 2008/0308361 A1* | 12/2008 | Nikovski | B66B 1/2458 187/385 |
| 2009/0218178 A1* | 9/2009 | Lence-Barreiro | B66B 5/0025 187/393 |
| 2011/0066300 A1* | 3/2011 | Tyagi | H02J 3/14 700/291 |
| 2011/0106328 A1* | 5/2011 | Zhou | G05B 13/024 700/291 |
| 2011/0144810 A1* | 6/2011 | Wesson | B66B 1/302 700/275 |
| 2012/0109392 A1* | 5/2012 | Hanks | H02J 3/382 700/291 |
| 2012/0111670 A1* | 5/2012 | Fargo | B66B 1/285 187/247 |
| 2012/0138388 A1* | 6/2012 | Finschi | B66B 1/2458 187/247 |
| 2012/0255813 A1* | 10/2012 | Atalla | B66B 1/20 187/382 |
| 2013/0056312 A1* | 3/2013 | Finschi | B66B 1/2416 187/382 |
| 2013/0096726 A1* | 4/2013 | Lyren | G05B 13/026 700/291 |
| 2013/0144451 A1* | 6/2013 | Kumar | G05B 13/02 700/291 |
| 2014/0008155 A1* | 1/2014 | Rossignol | B66B 1/302 187/290 |
| 2014/0231177 A1* | 8/2014 | Flynn | B66B 1/2458 187/247 |
| 2014/0360817 A1* | 12/2014 | Putkinen | B66B 1/2458 187/247 |
| 2014/0379153 A1* | 12/2014 | Lyren | G06Q 50/06 700/291 |
| 2015/0144434 A1* | 5/2015 | Herkel | B66B 1/302 187/276 |
| 2015/0145335 A1* | 5/2015 | Lyren | G05F 1/66 307/39 |
| 2016/0020609 A1* | 1/2016 | Carrasco | H02J 3/14 700/295 |
| 2016/0072288 A1* | 3/2016 | Debone | H02J 3/14 700/295 |
| 2016/0130112 A1* | 5/2016 | Nikovski | B66B 1/2458 187/247 |
| 2016/0188648 A1* | 6/2016 | Malcolm | G16H 10/60 707/746 |
| 2017/0069008 A1* | 3/2017 | Wang | H02J 13/00026 13/26 |
| 2017/0237289 A1* | 8/2017 | Thompson | G05B 15/02 700/296 |
| 2017/0369275 A1* | 12/2017 | Saraswat | B66B 1/28 |
| 2018/0099840 A1* | 4/2018 | Armistead | B66B 3/008 |
| 2019/0027933 A1* | 1/2019 | Lian | H02J 3/12 |
| 2019/0050758 A1* | 2/2019 | Kyllmann | G06Q 10/047 |
| 2019/0089153 A1* | 3/2019 | Miller | H02J 3/00 |
| 2019/0140451 A1* | 5/2019 | Raassina | G05F 1/66 |
| 2019/0252883 A1* | 8/2019 | Gubba Ravikumar | H02J 3/14 |
| 2019/0382235 A1* | 12/2019 | Pahlke | B66B 1/28 |
| 2020/0102186 A1* | 4/2020 | Pahlke | B66B 1/468 |

\* cited by examiner

MANAGING POWER DEMAND OF A PLURALITY OF PASSENGER TRANSPORT INSTALLATIONS

BACKGROUND

In the power grid, the supply and demand of electricity must be in balance at all times. The transformation of energy systems towards more renewable and distributed energy production poses major challenges for the electricity markets and participating parties. Large quantities of weather-dependent intermittent renewable generation combined to the global trend on increasing electricity consumption, hampers the task on maintaining the power grid balance. This has caused a shift towards more demand-based electricity tariffs, which penalize end-customers with highly volatile load profiles. At the same time, grid operators are forced to purchase more reserve for frequency regulation and demand response capacity to maintain the grid stability.

The power demand of existing passenger transport systems is extremely volatile. Short peaks in the power demand can be up to 30 times as high as the average demand resulting in significant transient peaks in the power demand of a building. On the other hand, the growing amount of renewable energy production and increasing overall grid demand put pressure on grid operators to have sufficient reserve capacity to maintain grid stability.

Therefore, new ways for maintaining the grid stability are constantly required. Thus, it would be beneficial to have a solution that would alleviate at least one of these drawbacks.

SUMMARY

According to at least some of the aspects, a solution is provided that coordinates and optimizes a fleet of demand flexible passenger transport installations. The solution enables turning problematic highly volatile loads into an asset for grid operators by harnessing them into a joint resource for frequency regulation and demand management.

According to a first aspect, there is provided a method for managing power demand of a plurality of passenger transport installations in at least one building. The method comprises obtaining first data on available time-dependent power consumption flexibility capacity from each passenger transport installation; obtaining second data from at least one external data source, the second data being independent from operation of the passenger transport installations; determining an activation order for power demand management of the plurality of passenger transport installations based on the obtained first data and second data; and transmitting a passenger transport installation specific activation signal for power demand management to at least one passenger transport installation of the plurality of passenger transport installations in accordance with the activation order.

In an embodiment, the method further comprises obtaining third data on activation costs of the available time-dependent power consumption flexibility capacity from each passenger transport installation; and taking the third data into account when determining the activation order.

In an embodiment, additionally or alternatively, determining an activation order further comprises determining a grid frequency threshold for at least one passenger transport installation; and transmitting a passenger transport installation specific activation signal further comprises transmitting the grid frequency threshold to the at least one passenger transport installation.

In an embodiment, additionally or alternatively, determining an activation order further comprises determining a start time for initiating the power demand management and/or an end time for terminating the power demand management; and transmitting a passenger transport installation specific activation signal further comprises transmitting the start time for initiating the power demand management and/or the end time for terminating the power demand management to the at least one passenger transport installation.

In an embodiment, additionally or alternatively, obtaining second data from at least one external data source comprises obtaining data from at least one of weather report data source, electricity cost data source, utility signal data source, electricity market data source and a load profile of one or more buildings.

In an embodiment, additionally or alternatively, the method further comprises obtaining data on active power from each passenger transport installation in predefined intervals; and transmitting a verification of implementing the power demand management to a grid operator based on the active power data.

In an embodiment, additionally or alternatively, the passenger transport installation specific activation signal comprises a request to curtail load, increase load, or feed energy back to the grid.

According to a second aspect, there is provided a method for managing power demand of a passenger transport installation of a building. The method comprises determining available time-dependent power consumption flexibility capacity of the passenger transport installation; and transmitting data indicating the available time-dependent power consumption flexibility capacity to an external control platform.

In an embodiment, the method further comprises receiving an activation signal for power demand management from the external control platform in response to the transmitted data; and managing the power demand according to the received activation signal.

In an embodiment, additionally or alternatively, the activation signal comprises a grid frequency threshold comprising a limit frequency to activate the power demand management; and the method further comprises initiating the power demand management when the grid frequency threshold is reached.

In an embodiment, additionally or alternatively, the activation signal comprises a start time for initiating the power demand management and/or an end time for terminating the power demand management; and the method further comprises initiating the power demand management in accordance with the start time and/or terminating the power demand management in accordance with the end time.

In an embodiment, additionally or alternatively, the method further comprises creating a traffic forecast as a function of time; and determining an activation cost of the available time-dependent power consumption flexibility capacity based on the determined available flexibility capacity and the traffic forecast.

In an embodiment, the method further comprises determining active power data of the passenger transport installation; and transmitting the active power data to the external control platform.

According to a third aspect, there is provided an apparatus for managing power demand of a plurality of passenger transport installations in at least one building. The apparatus comprises means for obtaining first data on available time-dependent power consumption flexibility capacity from each passenger transport installation; means for obtaining second data from at least one external data source, the second data being independent from operation of the passenger transport installations; means for determining an activation order for power demand management of the plurality of passenger transport installations based on the obtained first data and second data; and means for transmitting a passenger transport installation specific activation signal for power demand management to at least one passenger transport installation of the plurality of passenger transport installations in accordance with the activation order.

In an embodiment, the apparatus further comprises means for obtaining third data on activation costs of the available time-dependent power consumption flexibility capacity from each passenger transport installation, and means for taking the third data into account when determining the activation order.

In an embodiment, additionally or alternatively, the means for determining an activation order comprise means for determining a grid frequency threshold for at least one passenger transport installation; and the means for transmitting a passenger transport installation specific activation signal further comprise means for transmitting the grid frequency threshold to the at least one passenger transport installation.

In an embodiment, additionally or alternatively, the means for determining an activation order further comprise means for determining a start time for initiating the power demand management and/or an end time for terminating the power demand management; and the means for transmitting a passenger transport installation specific activation signal further comprise means for transmitting the start time for initiating the power demand management and/or the end time for terminating the power demand management to the at least one passenger transport installation.

In an embodiment, additionally or alternatively, obtaining second data from at least one external data source comprises obtaining data from at least one of weather report data source, electricity cost data source, utility signal data source, electricity market data source and a load profile of one or more buildings.

In an embodiment, additionally or alternatively, the apparatus further comprises means for obtaining data on active power from each passenger transport installation in predefined intervals; and means for transmitting a verification of implementing the power demand management to a grid operator based on the active power data.

In an embodiment, additionally or alternatively, the passenger transport installation specific activation signal comprises a request to curtail load, increase load, or feed energy back to the grid.

According to a fourth aspect, there is provided an apparatus for managing power demand of a passenger transport installation of a building. The apparatus comprises means for determining available time-dependent power consumption flexibility capacity of the passenger transport installation, and means for sending data indicating the available time-dependent power consumption flexibility capacity to an external control platform.

In an embodiment, the apparatus further comprises means for receiving an activation signal for the power demand management from the external control platform in response to the sent data; and means for managing power demand according to the received activation signal.

In an embodiment, additionally or alternatively, the activation signal comprises a grid frequency threshold comprising a limit frequency to activate the power demand management; and the apparatus further comprises means for initiating the power demand management when the grid frequency threshold is reached.

In an embodiment, additionally or alternatively, the activation signal comprises a start time for initiating the power demand management and/or an end time for terminating the power demand management; and the apparatus further comprises means for initiating the power demand management in accordance with the start time and/or terminating the power demand management in accordance with the end time.

In an embodiment, additionally or alternatively, the apparatus further comprises means for creating a traffic forecast as a function of time; and means for determining an activation cost of the available time-dependent power consumption flexibility capacity based on the determined available flexibility capacity and the traffic forecast.

In an embodiment, additionally or alternatively, the apparatus further comprises means for determining active power data of the passenger transport installation; and means for sending the active power data to the control platform.

According to a fifth aspect, there is provided a computer program comprising program code, which when executed by at least one processing unit, causes the at least one processing unit to perform the method of the first aspect or the second aspect.

According to a sixth aspect, there is provided a computer readable medium comprising program code, which when executed by at least one processor, causes the at least one processor to perform the method of the first aspect or the second aspect.

According to a seventh aspect, there is provided an apparatus for managing power demand of a plurality of passenger transport installations in at least one building. The apparatus comprises at least one processor, and at least one memory connected to the at least one processor. The at least one memory stores program instructions that, when executed by the at least one processor, cause the apparatus to obtain first data on available time-dependent power consumption flexibility capacity from each passenger transport installation of plurality of passenger transport installations; obtain second data from at least one external data source, the second data being independent from the operation of the passenger transport installations; determine an activation order for power demand management of the plurality of passenger transport installations based on the obtained first data and second data; and transmit a passenger transport installation specific activation signal for the power demand management to at least one passenger transport installation of the plurality of passenger transport installations in accordance with the activation order.

According to an eight aspect, there is provided an apparatus for managing power demand of a passenger transport installation of a building. The apparatus comprises at least one processor, and at least one memory connected to the at least one processor. The at least one memory stores program instructions that, when executed by the at least one processor, cause the apparatus to determine available time-dependent power consumption flexibility capacity of a passenger transport installation; and send data indicating the available time-dependent power consumption flexibility capacity to an external control platform.

The above discussed means may be implemented, for example, using at least one processor, at least one processor and at least one memory connected to the at least one processor, or at least one processor, at least one memory connected to the at least one processor and an input/output interface connected to the at least one processor.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

The following description illustrates a solution that aims to provide a flexible demand response resource for balancing the power grid.

Figure 1:
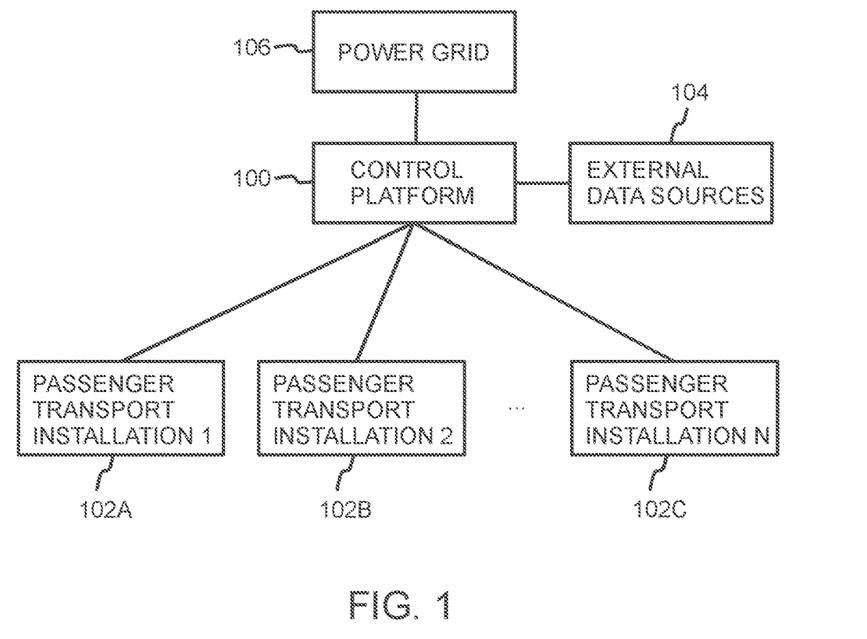
FIG. 1 illustrates a block diagram of a system for flexibly managing power demand of a plurality of passenger transport installations according to an aspect.

FIG. 1 illustrates a block diagram of a system for flexibly managing power demand of a plurality of passenger transport installations according to an aspect. The passenger transport installation refers, for example, to an elevator, an escalator, or a conveyer.

The system comprises a plurality of passenger transport installations 102A, 102B, 102C communicatively connected to an external control platform 100, i.e. an aggregation platform. The passenger transport installations 102A, 102B, 102C may be physically located in distant locations from each other, or they may locate in a same building. Further, in an embodiment, all the passenger transport installations 102A, 102B, 102C may be operated by the same entity. The control platform 100 is further communicatively connected to at least one external data source 104, providing data, for example, about electricity markets, reserve markets or demand management markets. The control platform 100 is configured to coordinate and optimize power management of the passenger transport installations 102A, 102B, 102C according to the data obtained from the installations, the at least one external data source 104. The passenger transport installations 102A, 102B, 102C may therefore comprise a so-called aggregator combining small-scale consumption and production into a large entity, which can participate in different electricity markets.

Figure 2:
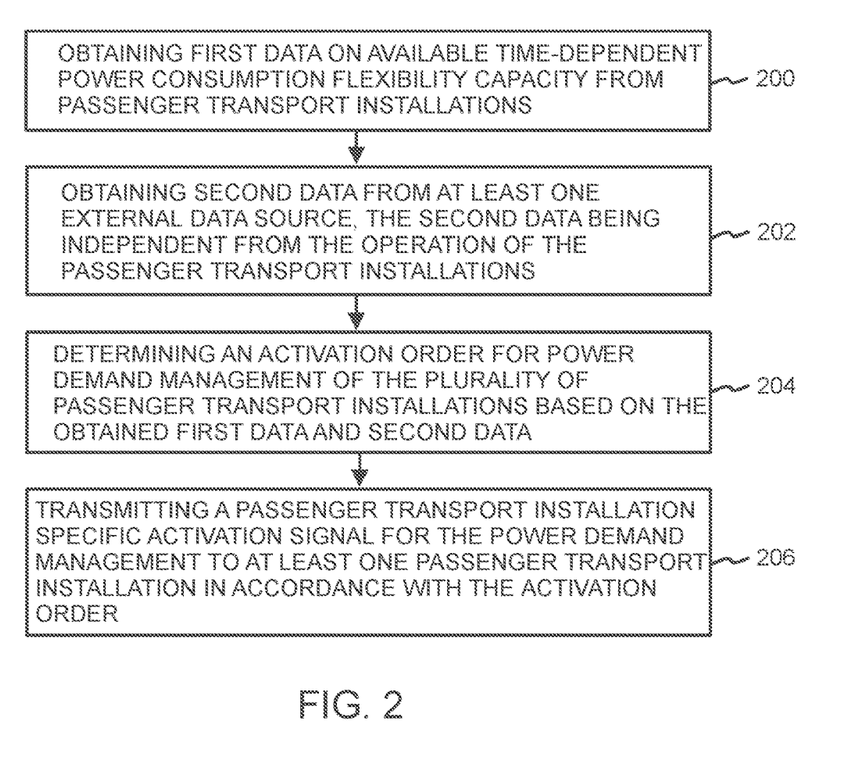
FIG. 2 illustrates a flow chart of a method for coordinating and optimizing power consumption of a plurality of passenger transport installations according to an aspect.

FIG. 2 illustrates a flow chart of a method for managing power demand of a plurality of passenger transport installations in at least one building according to an aspect. The steps discussed below may be performed by the control platform 100.

At 200 first data on available time-dependent power consumption flexibility capacity from the passenger transport installations in at least one building is obtained. The available flexibility capacity may refer to the amount of electrical power which may be released to be further used for the needs of the power grid, for example in frequency regulation. The term "time-dependent" may refer to the fact that available consumption flexibility capacity may vary. In other words, during a first time window there may be consumption flexibility capacity available, whereas during a second time window there may not be consumption flexibility capacity available.

At 202 second data from at least one external data source is obtained. The second data may be independent from the operation of the passenger transport installations (102A, 102B, 102C). The external data source may comprise obtaining data from, for example, a weather report data source, electricity cost data source, utility signal data source, electricity market data source, a load profile of one or more buildings or any other data source that is independent from the operation of the passenger transport installations and provides data required for power demand management of the plurality of passenger transport installations.

At 204 an activation order for power demand management of the plurality of passenger transport installations is determined based on the obtained first data and second data. This means, for example, that in addition to the power consumption flexibility capacity received from the passenger transport installations, also information from other data source is taken into account when determining the activation order. The activation order may be arranged in such a manner that the passenger transport installations with the lowest activation costs may be activated first. Similarly, the passenger transport installations with the highest activation cost may be activated last.

At 206 a passenger transport installation specific activation signal for the power demand management is transmitted to at least one passenger transport installation in accordance with the activation order. The activation signal may comprise, for example, a request to curtail load, increase load, or feed energy back to the power grid, for example, from an energy storage coupled to a passenger transport installation.

In an example, the control platform 100 may send to an operator of the power grid 106 information indicating how much available time-dependent power consumption flexibility capacity it has to offer. The operator may then reply by confirming the whole indicated amount of available time-dependent power consumption flexibility capacity or a subset of the whole amount. Thus, the activation signals sent by the control platform 100 may relate to the whole indicated amount of available time-dependent power consumption flexibility capacity or to a subset of the whole amount. In another embodiment, the reply from the operator may concern only a portion of the indicated amount by the control platform 100.

As an example, the control platform 100 may send the activation signal to all passenger transport installations with available power consumption flexibility capacity to curtail load when the obtained second data indicates that electricity costs are high in order to make savings in the electricity bill. As another example, the control platform 100 may send the activation signal only to some of the passenger transport installations with available power consumption flexibility capacity to curtail load and to some to feed energy back to the grid from their respective energy storages.

In an embodiment, third data on activation costs of the available time-dependent power consumption flexibility capacity may be obtained from each passenger transport installation. The activation cost may indicate the profitability of activating power management of the passenger transport installation by taking account the potential incentives, savings, possible waiting and/or transport time costs and passenger experience. The obtained third data may then be taking into account when determining the activations order. For example, one passenger transport installation may be able to provide significant power consumption savings during a specific time period, but at the same time, there exists a significant cost for the savings, for example, due to extended passenger waiting and/or transport time. This may then lead to a decision at the control platform 100 that the cost is too high and the power consumption savings are not applied.

In another embodiment, determining the activation order may further comprise determining a grid frequency threshold for at least one passenger transport installation. In other words, the ones with the lowest activation costs may have a grid frequency threshold closer to the nominal value (i.e. to 50 Hz or 60 Hz), and they will be activated first when the frequency starts to drift above or below the nominal value. The ones with higher activation costs may have a grid frequency threshold further away from the nominal value, and they will be activated only if the earlier activations are not sufficient to correct the frequency. Transmitting the passenger transport installation specific activation signal may then further comprise transmitting the grid frequency threshold to the at least one passenger transport installation.

As an example, one or more passenger transport installations may be requested to curtail load when the grid frequency drifts below 50 Hz, and some other passenger transport installations to curtail load when the grid frequency drifts below 49.9 Hz. In another example, one or more passenger transport installations may be requested to charge their energy storages from the power grid when the frequency exceeds 50 Hz, thus providing, for example, a night-time load for the grid.

In another embodiment, determining the activation order may further comprise determining a start time for initiating the power demand management and/or an end time for terminating the power demand management. Thus, when the passenger transport installation specific activation signal is transmitted, the control platform may additionally transmit the start time for initiating the power demand management and/or the end time for terminating the power demand management to the at least one passenger transport installation. Alternatively, the control platform may transmit a length of the power demand management (for example, 10 minutes from now on), or a start time and a length of the power demand management (for example, start at 06:00 and continue 30 minutes) to the at least one passenger transport installation.

In order to verify to a grid operator that power demand management has been implemented, data on active power from each passenger transport installation may be obtained in predefined intervals and a verification may be transmitted to the grid operator based on the active power data. The verification may be needed if the control platform 100 has, for example, made a bid on available power management to an electricity market. Thus, the control platform 100 is able to verify that power management has been implemented according to the bid in order to obtain incentives.

Figure 3:
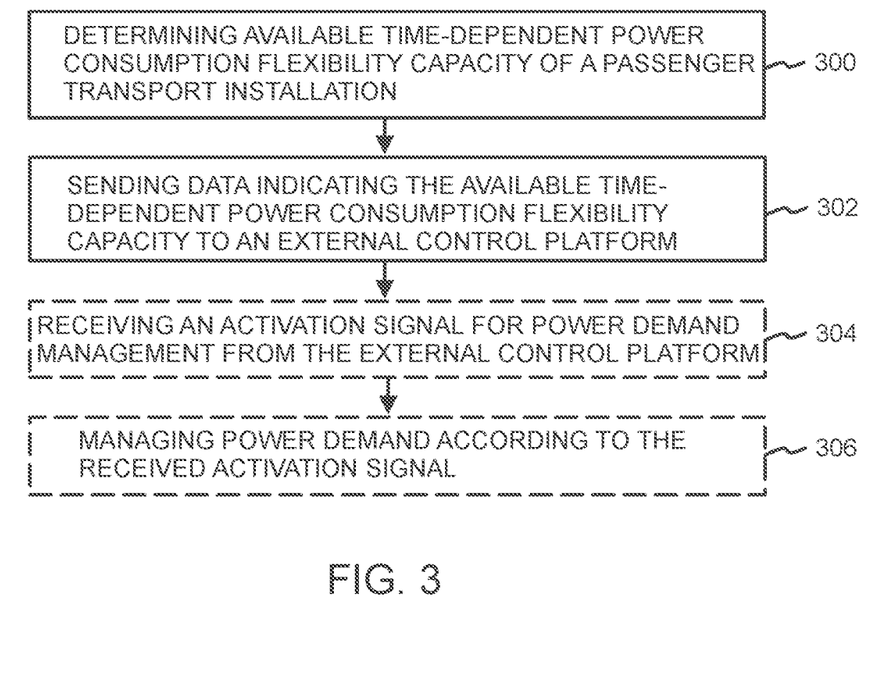
FIG. 3 illustrates a flow chart of a method for managing power demand of a passenger transport installation of a building according to an aspect.

FIG. 3 illustrates a flow chart of a method for managing power demand of a passenger transport installation in a building according to another aspect.

At 300 available time-dependent power consumption flexibility capacity of a passenger transport installation is determined. The available flexibility capacity may refer to the amount of electrical power which may be released for further use for the needs of the power grid, for example, when frequency regulation is needed. This may be implemented at the passenger transport installation side by utilizing an energy storage coupled to a drive of the elevator, adjusting driving parameters, such as drive speed or acceleration, or switching off energy-consuming features, such as lights or air-conditioning.

At 302 data indicating the available time-dependent power consumption flexibility capacity is sent to a control platform 100.

Optionally, at 304 an activation signal may be received for the power demand management from the control platform 100 in response to the sent data. Thereafter, power demand may be managed according to the received activation signal at 306. In an embodiment, the power demand management may be also initiated following a reached grid frequency threshold. The grid frequency threshold may comprise a power grid frequency limit for activating the power demand management. In an example, the activation signal may instruct the passenger transport installation to curtail load when the grid frequency drifts below 50 Hz. In another example, the activation signal may instruct the passenger transport installation to curtail load when the grid frequency drifts below 49.9 Hz. In another example, the passenger transport installations may be requested to charge its energy storage from the power grid when the frequency exceeds 50 Hz, thus providing, for example, a night-time load for the grid.

In another embodiment, the activation signal may comprise a start time for initiating the power demand management and/or an end time for terminating the power demand management. Thus, the passenger transport installation may then initiate the power demand management in accordance with the start time and/or terminate the power demand management in accordance with the end time. Alternatively, the passenger transport installation may receive a length of the power demand management (for example, 10 minutes from now on), or a start time and a length of the power demand management (for example, start at 06:00 and continue 30 minutes) from the from the control platform.

In another embodiment, a traffic forecast may be created as a function of time. The traffic forecast may be created to estimate the traffic intensity for example for the current day or during the next hour. Thereafter, an activation cost of the available time-dependent power consumption flexibility capacity may be determined based on the available time-dependent power consumption flexibility capacity and the traffic forecast. The activation cost may then indicate the profitability of activating power management by taking account the potential savings and passenger experience. For example, high available flexibility capacity and low estimated traffic intensity may indicate small activating cost, whereas low available flexibility capacity and higher estimated traffic intensity may indicate large activating cost. The activation cost may be sent to the control platform 100 with the data indicating available time-dependent power consumption flexibility capacity. In one embodiment, also active power data of the passenger transport installation may be determined and sent to the control platform 100.

The solutions illustrated in FIGS. 2 and 3 enable responding to the fluctuations in the power grid frequency very fast, having a second-level response time. Thus, it may be a valuable asset providing grid balancing services for grid operators. In addition, reduced peak power demand may result in lower capacity requirements for building power distribution system, reduced demand charges, and bringing down the costs of feeder cables, transformers, UPS, and back-up power generators.

The disclosed solution may also provide the ability to provide high value grid services, for example, via frequency regulation. Further, the disclosed solution may enable reduced infrastructure costs for building electrical systems, minimizing demand charges and shifting demand to low-price hours.

Further, the disclosed solution may also provide the ability to scale almost indefinitely the available pool of flexible passenger transport installations that the control platform then coordinates. Robustness is guaranteed by distributing decision-making process among all passenger transport installations in the network. Furthermore, these independent passenger transport installations are fully resistant against the failure of a single DEF influencing the operation of the entire aggregated pool.

Figure 4:
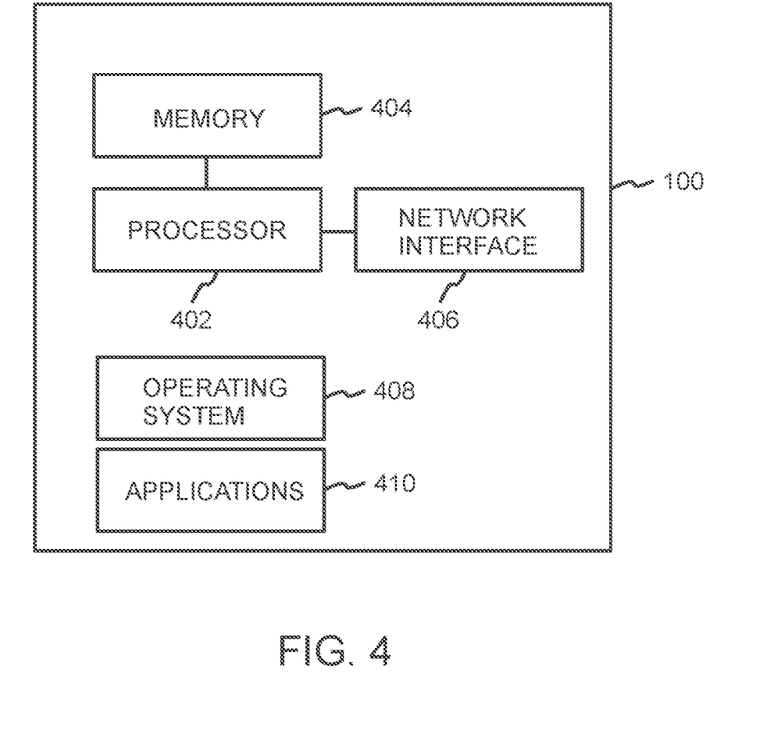
FIG. 4 illustrates a block diagram of an apparatus for managing power demand of a plurality of passenger transport installations according to an aspect.

FIG. 4 illustrates a block diagram of an apparatus 100 for coordinating and optimizing power consumption of a plurality of passenger transport installations according to an aspect.

The illustrated apparatus 100 can include a controller or processor 402 (e.g. signal processor, microprocessor, ASIC, or other control and processing logic circuitry) for performing such tasks as signal coding, data processing, input/output processing, power control, and/or other functions. The illustrated apparatus 100 can include a memory or memories 404. The memory 404 can include non-removable memory and/or removable memory. The non-removable memory can include RAM, ROM, flash memory, a hard disk, or other well-known memory storage technologies. The memory 404 can be used for storing data and/or code for running one or more applications.

The apparatus 100 may comprise an input/output interface enabling the apparatus 100 to communicate with other apparatuses. The apparatus 100 may further comprise a network interface 406 enabling communication with external devices or networks. The network interface 406 may include a wired or wireless transceiver for communicating with the external devices or networks. The memory 404 may store operating system software 408 that controls the operations of the apparatus 100. The memory 404 may also comprise one or more applications 410 that can be executed by the processor 402. The illustrated components of the apparatus 100 are all-inclusive, as any components can deleted and other components can be added.

The memory 404 may comprise a computer program that, when executed by the processor 402, causes the apparatus 100 to obtain first data on available time-dependent power consumption flexibility capacity from each passenger transport installation; obtain second data from at least one external data source, the second data being independent from the operation of the passenger transport installations; determine an activation order for power demand management of the plurality of passenger transport installations based on the obtained first data and second data; and transmit a passenger transport installation specific activation signal for the power demand management to at least one passenger transport installation of the plurality of passenger transport installations in accordance with activation order.

Further, any combination of the illustrated components disclosed in FIG. 4, for example, at least one of the processor 402 and the memory 404 may constitute means for obtaining first data on available time-dependent power consumption flexibility capacity from each passenger transport installation; means for obtaining second data from at least one external data source, the second data being independent from the operation of the passenger transport installations; means for determining an activation order for power demand management of the plurality of passenger transport installations based on the obtained first data and second data; and means for transmitting a passenger transport installation specific activation signal for the power demand management to at least one passenger transport installation of the plurality of passenger transport installations in accordance with activation order.

Figure 5:
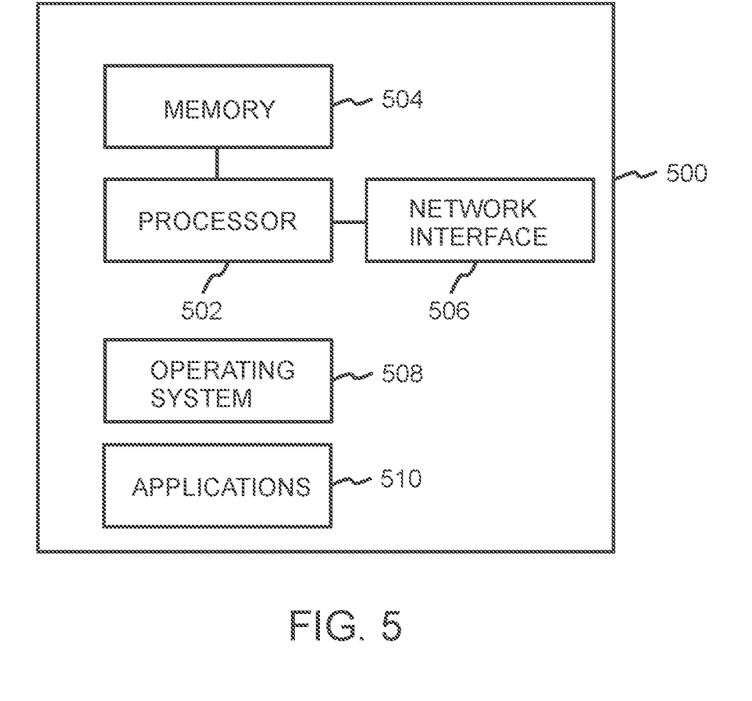
FIG. 5 illustrates a block diagram of an apparatus for managing power demand of a passenger transport installation of a building according to an aspect.

FIG. 5 illustrates a block diagram of an apparatus 500 for managing power demand of a passenger transport installation of a building according to an aspect.

The illustrated apparatus 500 can include a controller or processor 502 (e.g. signal processor, microprocessor, ASIC, or other control and processing logic circuitry) for performing such tasks as signal coding, data processing, input/output processing, power control, and/or other functions. The illustrated apparatus 500 can include a memory or memories 504. The memory 504 can include non-removable memory and/or removable memory. The non-removable memory can include RAM, ROM, flash memory, a hard disk, or other well-known memory storage technologies. The memory 504 can be used for storing data and/or code for running one or more applications.

The apparatus 500 may comprise an input/output interface enabling the apparatus 500 to communicate with other apparatuses. The apparatus 500 may further comprise a network interface 506 enabling communication with external devices or networks. The network interface 506 may include a wired or wireless transceiver for communicating with the external devices or networks. The memory 504 may store operating system software 508 that controls the operations of the apparatus 500. The memory 504 may also comprise one or more applications 510 that can be executed by the processor 502. The illustrated components of the apparatus 500 are all-inclusive, as any components can deleted and other components can be added.

The memory 504 may comprise a computer program that, when executed by the processor 502, causes the apparatus 500 to determine available time-dependent power consumption flexibility capacity of the passenger transport installation; and send data indicating the available time-dependent power consumption flexibility capacity to an external control platform.

Further, any combination of the illustrated components disclosed in FIG. 5, for example, at least one of the processor 502 and the memory 504 may constitute means for determining available time-dependent power consumption flexibility capacity of the passenger transport installation; and means for sending data indicating the available time-dependent power consumption flexibility capacity to an external control platform.

Example embodiments may be implemented in software, hardware, application logic or a combination of software, hardware and application logic. The example embodiments can store information relating to various methods described herein. This information can be stored in one or more memories, such as a hard disk, optical disk, magneto-optical disk, RAM, and the like. One or more databases can store the information used to implement the example embodiments. The databases can be organized using data structures (e.g., records, tables, arrays, fields, graphs, trees, lists, and the like) included in one or more memories or storage devices listed herein. The methods described with respect to the example embodiments can include appropriate data structures for storing data collected and/or generated by the methods of the devices and subsystems of the example embodiments in one or more databases.

All or a portion of the example embodiments can be conveniently implemented using one or more general purpose processors, microprocessors, digital signal processors, micro-controllers, and the like, programmed according to the teachings of the example embodiments, as will be appreciated by those skilled in the computer and/or software art(s). Appropriate software can be readily prepared by programmers of ordinary skill based on the teachings of the example embodiments, as will be appreciated by those skilled in the software art. In addition, the example embodiments can be implemented by the preparation of application-specific integrated circuits or by interconnecting an appropriate network of conventional component circuits, as will be appreciated by those skilled in the electrical art(s). Thus, the examples are not limited to any specific combination of hardware and/or software. Stored on any one or on a combination of computer readable media, the examples can include software for controlling the components of the example embodiments, for driving the components of the example embodiments, for enabling the components of the example embodiments to interact with a human user, and the like. Such computer readable media further can include a computer program for performing all or a portion (if processing is distributed) of the processing performed in implementing the example embodiments. Computer code devices of the examples may include any suitable interpretable or executable code mechanism, including but not limited to scripts, interpretable programs, dynamic link libraries (DLLs), Java classes and applets, complete executable programs, and the like. In the context of this document, a "computer-readable medium" may be any media or means that can contain, store, communicate, propagate or transport the instructions for use by or in connection with an instruction execution system, apparatus, or device, such as a computer. A computer-readable medium may include a computer-readable storage medium that may be any media or means that can contain or store the instructions for use by or in connection with an instruction execution system, apparatus, or device, such as a computer. A computer readable medium can include any suitable medium that participates in providing instructions to a processor for execution. Such a medium can take many forms, including but not limited to, non-volatile media, volatile media, transmission media, and the like.

While there have been shown and described and pointed out fundamental novel features as applied to preferred embodiments thereof, it will be understood that various omissions and substitutions and changes in the form and details of the devices and methods described may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiments may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

The invention claimed is:

1. A method for managing power demand of a plurality of passenger transport installations in at least one building, the method comprising:
    obtaining first data on available time-dependent power consumption flexibility capacity from each passenger transport installation;
    obtaining second data from at least one external data source, the second data being independent from operation of the passenger transport installations;
    obtaining third data on activation costs of the available time-dependent power consumption flexibility capacity from each passenger transport installation;
    determining an activation order for power demand management of the plurality of passenger transport installations based on the obtained first data, second data and third data; and
    transmitting a passenger transport installation specific activation signal for the power demand management to at least one passenger transport installation of the plurality of passenger transport installations in accordance with the activation order,
    wherein the obtaining the third data includes estimating a traffic intensity for each of the plurality of passenger transport installations for a predetermined period of time,
    wherein the at least one external data source includes a weather report data source, an electricity cost data source, a utility signal data source or a load profile of the at least one building, and
    wherein the power demand management to the at least one passenger transport installation further includes adjusting a drive speed and/or acceleration of the at least one passenger transport installation.

2. The method of claim 1, wherein determining an activation order further comprises:
    determining a grid frequency threshold for the at least one passenger transport installation; and
    transmitting a passenger transport installation specific activation signal further comprises transmitting the grid frequency threshold to the at least one passenger transport installation,
    wherein the grid frequency threshold includes a power grid frequency limit for activating the power demand management.

3. The method according to claim 1, wherein determining an activation order further comprises:
    determining a start time for initiating the power demand management and/or an end time for terminating the power demand management; and
    transmitting a passenger transport installation specific activation signal further comprises transmitting the start time for initiating the power demand management and/or the end time for terminating the power demand management to the at least one passenger transport installation.

4. The method of claim 1, further comprising:
    obtaining data on active power from each passenger transport installation in predefined intervals; and transmitting a verification of implementing the power demand management to a grid operator based on the active power data.

5. The method of claim 1, wherein the passenger transport installation specific activation signal comprises a request to curtail load, increase load, or feed energy back to the grid.

6. The method of claim 1, wherein each of the plurality of passenger transport installations includes an energy storage, and
wherein the transmitting a passenger transport installation specific activation signal for the power demand management to at least one passenger transport installation includes:
sending activation signals to a first group of passenger transport installations determined to have available power consumption flexibility capacity to cause the first group of passenger transport installations to activate, and
controlling a second group of passenger transport installations to feed energy back to the grid from their respective energy storages.

7. A method for managing power demand of a passenger transport installation of a building, the method comprising:
determining available time-dependent power consumption flexibility capacity of the passenger transport installation;
sending data indicating the available time-dependent power consumption flexibility capacity to an external control platform;
receiving an activation signal for power demand management from the external control platform in response to the sent data; and
initiating power demand management of the passenger transport installation according to the received activation signal,
wherein the determining the available time-dependent power consumption flexibility capacity of the passenger transport installation includes estimating a traffic intensity for the passenger transport installation for a predetermined period of time, and
wherein the power demand management includes adjusting a drive speed and/or acceleration of the passenger transport installation.

8. The method of claim 7, wherein the activation signal comprises a grid frequency threshold comprising a limit frequency to activate the power demand management; and wherein the method further comprises:
initiating the power demand management when the grid frequency threshold is reached.

9. The method of claim 7, wherein the activation signal comprises a start time for initiating the power demand management and/or an end time for terminating the power demand management; and wherein the method further comprises:
initiating the power demand management in accordance with the start time; and/or
terminating the power demand management in accordance with the end time.

10. The method of claim 7, further comprising:
determining active power data of the passenger transport installation; and
sending the active power data to the control platform.

11. An apparatus for managing power demand of a passenger transport installation of a building, the apparatus including a processor connected to the passenger transport installation and memory in the form of a non-transitory computer readable medium comprising computer executable program code, when run on the processor, causes the processor to:
determine for determining available time-dependent power consumption flexibility capacity of the passenger transport installation;
send data indicating the available time-dependent power consumption flexibility capacity to an external control platform; and
implement the method of claim 7.

12. The method claim 7, wherein the passenger transport installation includes an energy storage, and
wherein the method further comprises receiving a signal to cause the passenger transport installation to feed energy back to the grid from the energy storage.

13. An apparatus for managing power demand of a plurality of passenger transport installations in at least one building, the apparatus comprising:
a processor connected to the plurality of passenger transport installations; and
memory in the form of a non-transitory computer readable medium comprising computer executable program code, when run on the processor, causes the processor to:
obtain first data on available time-dependent power consumption flexibility capacity from each passenger transport installation,
obtain second data from at least one external data source, the second data being independent from operation of the passenger transport installations,
obtaining third data on activation costs of the available time-dependent power consumption flexibility capacity from each passenger transport installation,
determine an activation order for power demand management of the plurality of passenger transport installations based on the obtained first data, second data and third data, and transmit a passenger transport installation specific activation signal for the power demand management to at least one passenger transport installation of the plurality of passenger transport installations in accordance with the activation order,
wherein the obtaining the third data includes estimating a traffic intensity for each of the plurality of passenger transport installations for a predetermined period of time,
wherein the at least one external data source includes a weather report data source, an electricity cost data source, a utility signal data source or a load profile of the at least one building, and
wherein the power demand management to the at least one passenger transport installation further includes adjusting a drive speed and/or acceleration of the at least one passenger transport installation.

14. A system comprising:
the apparatus of claim 13; and
a plurality of apparatuses for managing power demand of a passenger transport installation of a building, each of the plurality of apparatuses being configured to:
determine available time-dependent power consumption flexibility capacity of the passenger transport installation; and
send data indicating the available time-dependent power consumption flexibility capacity to an external control platform.

15. The apparatus of claim 13, wherein each of the plurality of passenger transport installations includes an energy storage, and
wherein the transmitting a passenger transport installation specific activation signal for the power demand management to at least one passenger transport installation includes:
sending activation signals to a first group of passenger transport installations determined to have available power consumption flexibility capacity to cause the first group of passenger transport installations to activate, and
controlling a second group of passenger transport installations to feed energy back to the grid from their respective energy storages.

16. An apparatus for managing power demand of a passenger transport installation of a building, the apparatus comprising:
a processor connected to the passenger transport installation; and
memory in the form of a non-transitory computer readable medium comprising computer executable program code, when run on the processor, causes the processor to:
determine available time-dependent power consumption flexibility capacity of the passenger transport installation,
send data indicating the available time-dependent power consumption flexibility capacity to an external control platform,
receive an activation signal for power demand management from the external control platform in response to the sent data, and
manage power demand of the passenger transport installation according to the received activation signal,
wherein the determining the available time-dependent power consumption flexibility capacity of the passenger transport installation includes estimating a traffic intensity for the passenger transport installation for a predetermined period of time, and
wherein the power demand management includes adjusting a drive speed and/or acceleration of the at least one passenger transport installation.

17. The apparatus of claim 16, wherein the passenger transport installation includes an energy storage, and
wherein the memory further causes the processor to receive a signal to cause the passenger transport installation to feed energy back to the grid from the energy storage.

* * * * *